United States Patent [19]

Hamlin et al.

[11] Patent Number: 4,661,124
[45] Date of Patent: Apr. 28, 1987

[54] MOLECULAR SIEVE TYPE GAS SEPARATION SYSTEMS

[75] Inventors: Humphrey A. S. Hamlin, Montacute; Roger M. Marsh, Sherborne, both of England

[73] Assignee: Normalair-Garrett (Holding) Limited, Yeovil, England

[21] Appl. No.: 440,636

[22] Filed: Nov. 10, 1982

[30] Foreign Application Priority Data

Nov. 13, 1981 [GB] United Kingdom ................. 8134294

[51] Int. Cl.$^4$ ............................................. B01D 53/04
[52] U.S. Cl. .......................................... 55/21; 55/68; 55/75; 55/163; 55/389
[58] Field of Search ................... 55/18, 20, 21, 68, 75, 55/160, 162, 163, 179, 180, 389

[56] References Cited

U.S. PATENT DOCUMENTS

| | | | |
|---|---|---|---|
| 3,880,616 | 4/1975 | Myers et al. | 55/179 X |
| 3,922,149 | 11/1975 | Ruder et al. | 55/21 |
| 4,101,298 | 7/1978 | Myers et al. | 55/179 X |
| 4,197,095 | 4/1980 | White, Jr. et al. | 55/179 X |
| 4,205,967 | 6/1980 | Sandman et al. | 55/179 X |
| 4,299,595 | 11/1981 | Benkmann et al. | 55/21 |
| 4,322,228 | 3/1982 | Myers et al. | 55/179 X |
| 4,331,455 | 5/1982 | Sato | 55/21 |
| 4,349,357 | 9/1982 | Russell | 55/179 X |

FOREIGN PATENT DOCUMENTS

0046369 2/1982 European Pat. Off. .

*Primary Examiner*—Robert Spitzer
*Attorney, Agent, or Firm*—Larson and Taylor

[57] ABSTRACT

A molecular sieve type gas separation system capable of delivering oxygen-enriched air by increasing the oxygen content of air fed to the system has control means including a valve arrangement associated with each sieve bed for cyclically subjecting each bed to a charge/adsorption on-stream phase followed by a purge/desorption regeneration phase. During the regeneration phase of each sieve bed the gas pressure in the bed at least substantially equals the ambient atmospheric pressure or a pressure related thereto such as the ambient pressure of an outlet to which the oxygen-enriched air is being delivered and, for a predetermined range of outlet ambient pressure, the overall cycle time and the relative durations of the phases are fixed at values such that the oxygen content of air delivered by the system remains within physiologically acceptable limits for breathing.

In application of the system to an aircraft for supplying oxygen-enriched air to aircrew, the outlet will generally comprise one or more oral-nasal breathing masks and during the regeneration phase the beds are preferably opened to the ambient atmospheric pressure of the aircraft.

4 Claims, 7 Drawing Figures

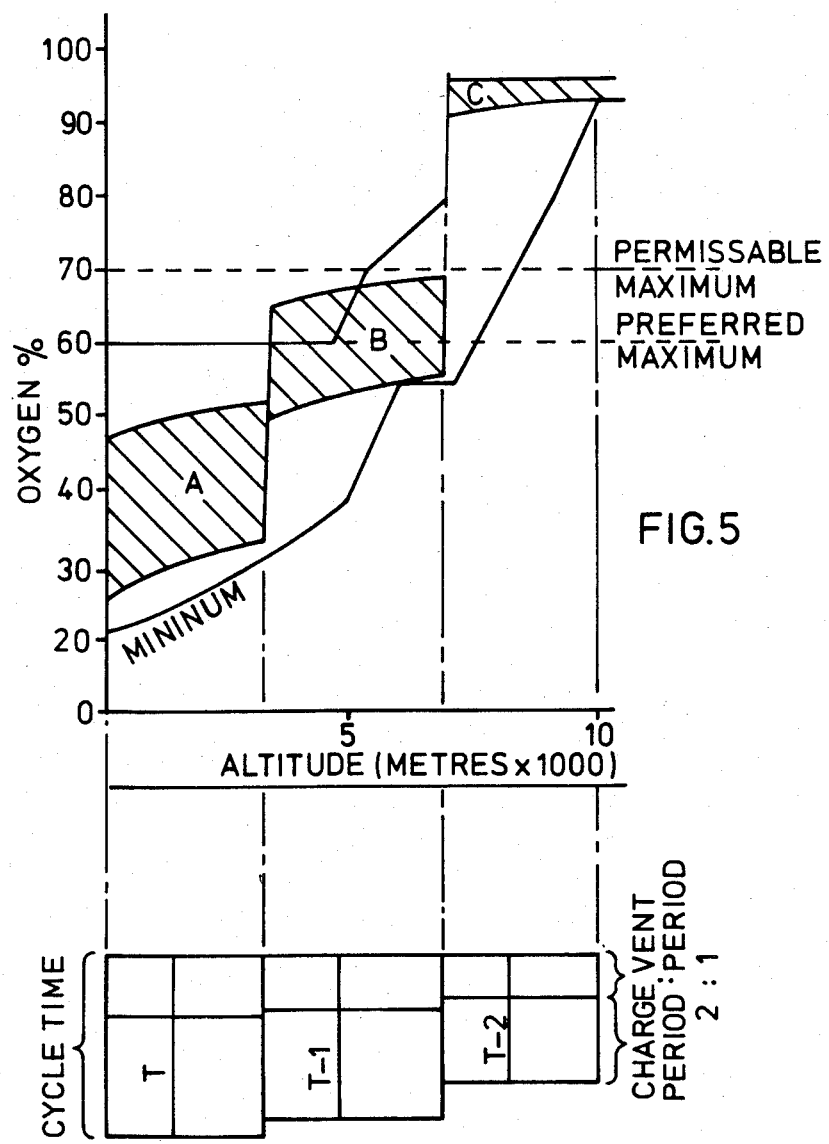

MOLECULAR SIEVE TYPE GAS SEPARATION SYSTEMS

DESCRIPTION OF INVENTION

This invention relates to gas separation systems utilising molecular sieves and is especially but not exclusively concerned with the employment of such systems in the aviation field for obtaining oxygen-enriched air as a breathable gas for aircrew.

In a gas separation system utilising zeolithic molecular sieves, a feed gas mixture is caused to flow through a bed of zeolite molecular sieve material having the capability of retaining unwanted constituent(s) of the gas mixture while passing the wanted constituent(s); for instance, in the separation of oxygen from air a molecular sieve material Type 5A as available, for example, from Bayer AG and Union Carbide Corporation may be used to hold back nitrogen and to pass oxygen to provide a delivery of a product gas that is approximately 95% oxygen. In the operation of such a system, the sieve material becomes progressively saturated with the retained gas constituent(s), e.g. nitrogen, and eventually becomes incapable of retaining further amounts of such constituent(s). The sieve material of the bed therefore has to be regenerated from time to time to purge it of the retained constituent(s). Typically regeneration is effected by flushing the bed, usually in the reverse direction, with the product gas while the outflow from the bed is discharged, e.g. to atmosphere.

To provide for continuous delivery of the desired product gas, the system may include a reservoir from which product gas is drawn for flushing the bed for regeneration purposes. Additionally or alternatively, the system may include a plurality of beds arranged to be utilised and regenerated in an overlapping sequence to provide for continuous delivery of a required product gas.

A common manner of operating a gas separation system employing one or more molecular sieve beds involves charging the or each bed with feed gas mixture—e.g. air—under pressure and continuing the feed to the bed to maintain the charge pressure during delivery of the required product gas constituent(s) to use or storage. When the bed approaches saturation, the feed is discontinued and the bed vented to release the charge pressure, whereafter the bed is purged. The pressurising of the sieve bed promotes adsorption of the constituents to be retained by the bed, while the subsequent depressurising promotes desorption of the retained constituents to facilitate flushing of these from the bed.

In aircraft applications it is normally required that the oxygen concentration (partial pressure) in the breathable gas supplied to aircrew shall be related to cabin altitude, i.e. to the ambient pressure obtaining within their enclosure.

Hitherto in early proposed aircraft applications of molecular sieve type gas separation systems, such systems have been treated as a source of substantially pure oxygen to be utilised in the manner traditional in aircrew breathable gas supply systems: that is to say, the substantially pure oxygen product gas delivered by the separation system is proposed to be diluted with air to provide a breathable gas mixture of the required oxygen partial pressure, in a manner analogous to the utilisation of the oxygen obtained from sources such as high pressure storage bottles and liquid oxygen converters.

The utilisation of a product gas that is substantially pure oxygen for producing oxygen-enriched air as breathable gas involves the use of appropriate mixing valves and related control devices to derive the desired breathable gas mixture. Such valves and control devices tend to be heavy and to be potentially unreliable through their inclusion of capsules and the like for sensing ambient pressure changes.

It has been proposed, therefore, to operate such a sieve system to produce a breathable gas of the required oxygen partial pressure directly from the molecular sieve system rather than by downstream dilution.

One embodiment of this concept disclosed in GB-A-2,029,257 (Linde) is a method of producing breathable gas having an oxygen concentration dependent on altitude, comprising obtaining the total volume of breathable gas required in normal continuous service solely by the controlled adsorptive removal of nitrogen from compressed air by means of reversible adsorbers operated in a cycle comprising adsorption and reverse desorption phases. The adsorbers are so operated that, during each adsorption phase, a continuously increasing proportion of nitrogen passes through to the outlet end of the adsorber on stream and the oxygen concentration of the respiration gas formed is adjusted within permissible range in accordance with the cabin pressure by controlling the amount of gas flowing through the adsorbers and/or the ratio of adsorption to desorption pressure.

In another embodiment of this concept, disclosed in EP-A-0,046,369 (Normalair-Garrett), control means responsive to the composition of the product breathable gas are adapted to control regeneration of the adsorber beds to maintain delivery of a product gas having the desired oxygen partial pressure. The control means utilises a microprocessor for control of the regeneration phase and also to provide a variety of other useful system functions.

The system disclosed in EP-A-0,046,369 was originally envisaged primarily for use on advanced high performance combat aircraft, possibly with development potential still to be realised, so that the scope accorded by microprocessor-based control was not out of place and, indeed lends itself to the introduction of more advanced life support systems. However, with the potential use of molecular sieve type gas separation systems in more cost-conscious aircraft such as trainers, the emphasis is now on the attraction of minimal ground servicing.

According to the present invention a molecular sieve type gas separation system adapted to deliver oxygen-enriched air to an outlet by decreasing the non-oxygen content of air fed to the system, comprising at least one sieve bed and control means for cyclically subjecting said bed to a charge/adsorption on-stream phase followed by a purge/desorption regeneration phase is characterised in that said control means provide that during said regeneration phase the gas pressure in said bed at least substantially equals the ambient atmospheric pressure or a pressure related thereto and that for a predetermined range of ambient atmospheric pressure the overall cycle time and the relative durations of said phases are fixed at values such that the oxygen content of the oxygen-enriched air delivered to said outlet remains within physiologically acceptable limits for breathing.

In application of a system in accordance with the present invention to an aircraft for supplying oxygen-enriched air to aircrew, the outlet will generally comprise one or more oral-nasal breathing masks.

In the regeneration phase it is preferable for obtaining best efficiency that the bed be opened to the lowest available pressure which in the aircraft application will be ambient atmospheric pressure; however, the bed may be opened to cabin pressure which is directly related to ambient atmospheric pressure.

Preferably, the control means set the cycle time and/or the phase relative durations at different values for respectively different ranges of outlet ambient pressure.

The control means may comprise a fixed logic sequencer controlling the sequential operation of charge and vent valves associated with the bed, and may further include transducer means responsive to outlet ambient pressure for selectively associating said fixed logic elements with said charge and vent valves in accordance with the ambient pressure of the outlet.

Within at least one predetermined range of outlet ambient pressure, the control means may provide phase relative durations in the ratio of 2:1 in favour of the charge/adsorption phase. The control means may reduce the cycle time in steps as the outlet ambient pressure reduces.

The invention will now be further described by way of example and with reference to the accompanying drawings in which, FIG. 1 is a schematic representation of a molecular sieve gas separation system, including three beds, suitable for aircraft applications;

FIG. 5 is a graph similar to FIG. 4, showing closer to optimum bands of oxygen concentration which are obtainable within bands of altitude between ground level and 10,000 meters; and FIG. 5A is a histogram similar to FIG. 4A, showing the ratio of the charge to vent periods for the modified cycle times required to obtain the bands of oxygen concentration shown in FIG. 5.

Figure 1:
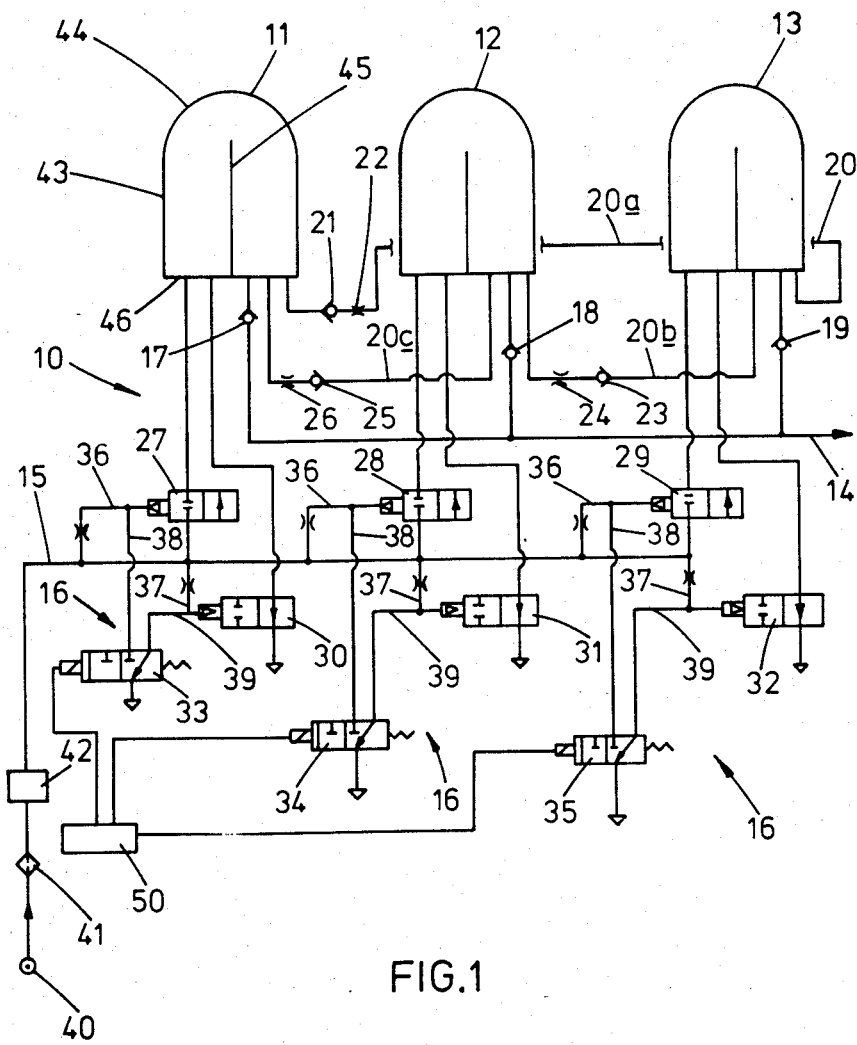

Referring to FIG. 1, a molecular sieve gas separation system 10, in accordance with one embodiment of the invention, comprises three molecular sieve beds 11, 12, 13, suitably contained and arranged to deliver product gas to a delivery line 14. The sieve beds 11, 12, 13 are arranged for receiving compressed air from a supply line 15 under the control of three similar valve arrangements 16. In this embodiment the sieve beds are suited to the adsorption of nitrogen by use of Type 5A molecular sieve material while passing oxygen so that the product gas delivered to line 14 is oxygen-enriched air having an oxygen partial pressure determined by the operation of the system as explained hereinafter.

The sieve beds 11, 12, 13 are connected to the delivery line 14 by way of pressure opening valves 17, 18, 19, respectively, and are also connected in series, one to another, by a purge loop 20. Between beds 11 and 13, in section 20a of the loop 20, is included a pressure opening valve 21 upstream of a flow regulating orifice 22; in section 20b between beds 13 and 12 a pressure opening valve 23 is positioned upstream of a flow regulating orifice 24 and, likewise, in section 20c between beds 12 and 11 a pressure opening valve 25 is positioned upstream of a flow regulating orifice 26.

Each valve arrangement 16 controls a charge inlet port and a vent port of a single sieve bed and comprises a charge valve and a vent valve of similar construction controlled by a servo valve. Thus each sieve bed 11, 12, 13 is connected to the supply line 15 via a charge valve 27, 28, 29, respectively, and to ambient atmospheric pressure or to an ambient pressure directly related thereto via a vent valve 30, 31, 32, respectively.

The servo chambers of each pair of charge and vent valves 27/30, 28/31 and 29/32, are connected to the supply line 15 and also to a servo valve comprising for each respective pair of charge and vent valves, a solenoid operated bleed switching valve, 33, 34, 35, respectively. Each switching valve 33, 34, 35, is actuated by a fixed logic sequencer 50 having an operating ratio of 2:1. The switching valves 33, 34, 35 serve the pairs of charge and vent valves 27/30, 28/31, and 29/32, respectively, in a manner in which while a charge valve is open its companion vent valve is closed and vice versa, and the sequencer is so connected as to cause the open period of the charge valves to be twice that of the vent valves.

The cross-sectional area of the vent flow paths from the sieve beds to ambient is greater than the corresponding area of the supply air flow path into the beds.

In this embodiment it is preferred that all the pressure opening valves 17, 18, 19, 21, 23, 25; the charge valves 27, 28, 29; and the vent valves 30, 31, 32 are of resilient diaphragm type (not illustrated structurally).

The charge and the vent valves are arranged for their diaphragms to be pressure closed upon their valve seats by supply pressure fed to their servo chambers via restricted ducts 36, 37, respectively, and for relief of these chambers via unrestricted ducts 38, 39, respectively. The pressure opening valves 17, 18, 19 and 21, 23, 25 utilise perforated diaphragms urged to close upon their seats against upstream pressure with a predetermined force applied by a compression spring, which in this embodiment is equivalent to, say, 69 kPa (10 psi) in respect of the purge loop valves 21, 23, 25, and 14 kPa (2 psi) in respect of the product delivery line valves 17, 18, 19.

Whilst the sieve beds 11, 12, 13 may be of any profile and form which is suitable to the system and an available space envelope, in this embodiment the sieve bed container comprises a tube 43 having one end closed by a semi-spherical wall 44 and the opposite end secured to a base plate 46. The container is divided internally by a diametrical wall 45 extending from the base plate 46 to terminate short of the semi-spherical wall 44. The base plate 46 is provided with a charge inlet port and a vent port positioned at one side of the dividing wall 45, and a purge loop connection and a delivery line connection positioned at the other side of the dividing wall.

In the aircraft application, the system delivers oxygen-enriched air as breathable gas to aircrew usually by way of oral-nasal breathing masks. Supply air is obtained from an engine source 40 of the aircraft and fed into the supply line 15 to the sieve beds by way of a filter 41 disposed upstream of a suitable pressure control valve 42 which, for example, may be set to open to a source pressure of 276 kPa (40 psi) and control at 310 kPa (45 psig). The delivery line 14 feeds to an oral-nasal breathing mask (not shown) by way of a demand type breathable gas regulator of suitable form (not shown), upstream of which is a standby pressurised breathable gas source (not shown), such as an oxygen cylinder for providing 100% oxygen deliverable to the regulator in conditions of low supply-air pressure, low cabin pressure or low concentration (partial pressure) of oxygen in the product gas delivered from the molecular sieve beds. The standby gas source may be activated by any suitable monitor/activator system.

In operation, a desired concentration (partial pressure) of oxygen in the delivered product gas, such as to provide, say, the equivalent of air at an altitude of 1,500 meters (5,000 feet) is maintained by control of the regeneration of the molecular sieve beds. In this connection it should be noted that in operation of a sieve bed, such as one of the beds 11, 12, 13, optimum gas separation efficiency is obtained when the bed is in a fully purged nitrogen-free condition. As the bed becomes progressively saturated with retained nitrogen, its separating efficiency declines.

In prior art gas separation systems a molecular sieve bed is placed on-stream cyclically and into regeneration in accordance with a schedule that provides for full purging of the bed material at each regeneration, and subsequent retention of the bed on-stream only for so long as it is delivering oxygen of the maximum practical purity. Thus, in such a system full regeneration is routinely effected before the separating efficiency of the bed material has significantly declined as a result of nitrogen saturation.

However, in gas separation systems embodying the present invention, and as in the systems disclosed in our aforementioned EP-A-0,046,369, the bed is continually operated in a partially saturated condition so as to deliver air enriched with oxygen to a desired partial pressure. This is accomplished by restricting purging of the bed so as not to fully cleanse it at each regeneration. In the system disclosed in our aforementioned EP-A-0,046,369, restriction of bed purging is controlled according to various parameters pertaining to the physiological well-being of the aircrew, which parameters are continuously monitored and acted upon in appropriate manner such as through a microprocessor.

In contradistinction, whilst the sieve beds in the system in accordance with the present invention are continually operated in a partially saturated condition so as to deliver air enriched with oxygen to a desired partial pressure, this is achieved by control means without use of a feed-back control loop. The control means cyclically subjects each bed to a charge/adsorption on-stream phase followed by a purge/desorption regeneration phase and provides that during the regeneration phase the gas pressure in the bed at least substantially equals the ambient atmospheric pressure of the aircraft or, alternatively, the cabin ambient pressure, and that for a predetermined range of cabin ambient pressures the overall cycle time and the relative durations of the phases are fixed at values such that the oxygen content of air delivered to the cabin remains within physiologically acceptable limits for breathing by an occupant of the cabin.

To obtain most efficient working of the beds their pressure should be reduced during the regeneration phase to the lowest available pressure. Thus it will be preferable to vent the beds overboard to the ambient atmosphere of the aircraft. However, they may be vented to the aircraft cabin, the cabin ambient pressure being directly related to ambient atmospheric pressure.

In the illustrated embodiment, the beds 11, 12, 13 are placed on-stream and regenerated in alternating and overlapping sequence by operation of the valve arrangements 16 in which the solenoid operated switching valves 33, 34, 35 are controlled by the fixed logic sequencer 50 alternately to open and close the charge and vent ports of their respective beds by alternate connection of the servo chamber of the charge valves 27, 28, 29 and vent valves 31, 32, 33 to ambient. As previously stated, the sequencer is arranged to control the charge and vent valves such that the former are open for twice the period of time of the latter. Regulation of the purging phase of each bed and the delivery of product gas therefrom is automatically achieved by means of the pressure opening valves 21, 23, 25 and 17, 18, 19, respectively.

Figure 2:
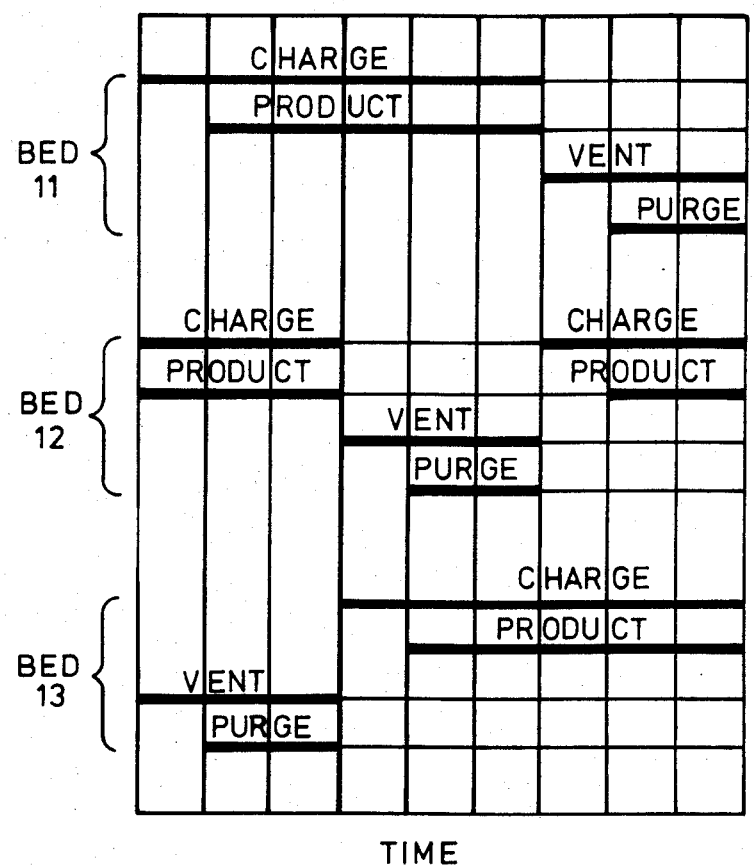
FIG. 2 is a diagram showing the operating sequence of the principal valves of the system shown in FIG. 1.

The time of opening of all the valves and the overlapping relationship of the three beds is best understood with reference to FIG. 2. With the opening of the charge valve 27 of, nominally, the first bed 11 in sequence, when the switching valve 33 is holding servo pressure in the vent valve 30 and releasing it from the charge valve 27, supply air is fed into the bed wherein nitrogen is adsorbed by the molecular sieve material and oxygen-enriched air is passed into the delivery line 14 on opening of the valve 17. At the end of the period of charging and delivering product gas, that is two thirds of the way through the sequence, the switching valve 33 is reversed to close the charge valve 27 and open the vent valve 30, whereupon the bed 11 becomes open to ambient and discharges thereinto so commencing desorption of nitrogen from the sieve material while reducing the pressure in the bed 11 and in that part of section 20c of the purge loop 20 which is downstream of the valve 25. Upon the pressure difference across the valve 25 rising above the closing load, initial stage product gas from the overlapping, sequentially second, bed 12 flows into bed 11 to purge it clean.

Thus compressed supply air is admitted cyclically to the beds 11, 12, 13 by way of the respective sequencer controlled valve arrangements 16 and when a bed is on-stream, oxygen-enriched air flows from the bed into the delivery line, but shortly after switching of the charge and vent valves to opposite mode the bed is purged by new product gas from one of the other beds coming on-stream. Thus bed 11 purges bed 13, bed 12 purges bed 11 and bed 13 purges bed 12. Evenness of flow is not lost during the withdrawal of some product gas from one bed for the purpose of purging another bed because the third bed still continues to deliver product gas during this period.

Variation in the partial pressure of oxygen in the oxygen-enriched air occurs with change in pressure of the ambient condition to which the bed is vented so that the concentration of oxygen increases with reducing ambient pressure owing to the rate of desorption of nitrogen from the sieve material increasing. Thus variation in the concentration of oxygen in the product gas automatically remains satisfactory for most presently known operational requirements up to a cabin altitude (pressure) of 6,000 meters (20,000 feet).

Figure 3:
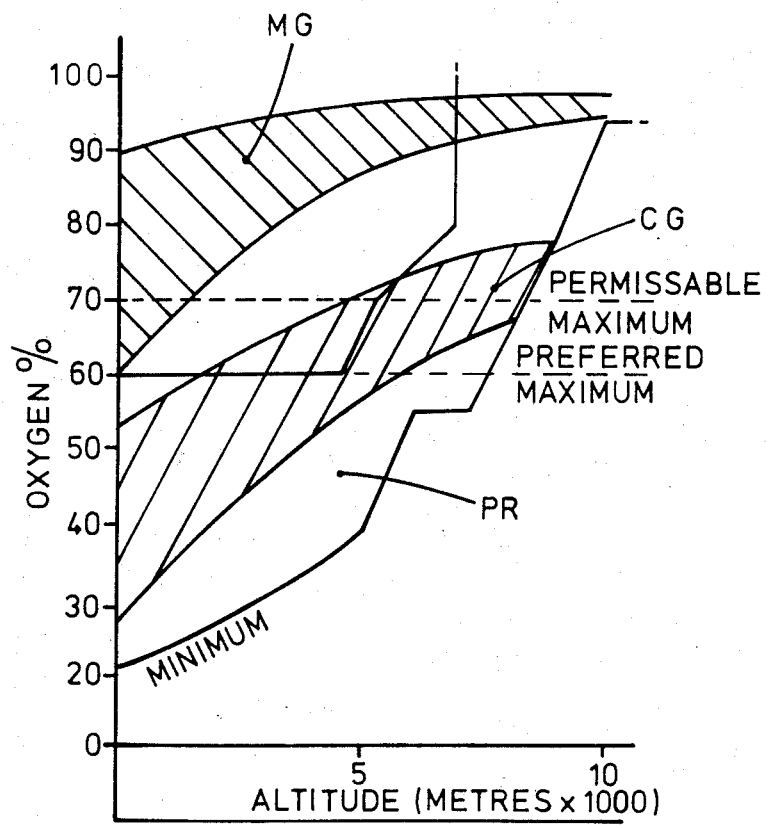
FIG. 3 is a graph showing the band of oxygen concentration available from two particular grades of molecular sieve material and the band for the physiological requirement for oxygen, from ground level to 10,000 meters altitude.

In investigating various types of molecular sieve material we have also found that use can be made of the fact that the ability of a sieve bed to adsorb nitrogen varies according to the molecular sieve material. For example, a medical grade Type 5A sieve material is appreciably more efficient than a commercial grade Type 5A sieve material so that at lower altitudes greater degradation of a bed containing medical grade material is required in order to obtain an oxygen concentration in the product gas appropriate to the pertaining altitude than is required of a bed containing commercial grade material. FIG. 3 is a graph which plots percentage concentration of oxygen against altitude and shows a band, reference MG, of concentration of oxygen available from a medical grade material, a band, reference CG, of concentration of oxygen available from a commercial grade material, and a band, reference PR, of the physiological requirement for oxygen from ground level to 10,000 meters (33,000 feet) cabin altitude.

Figures 4, 4A:
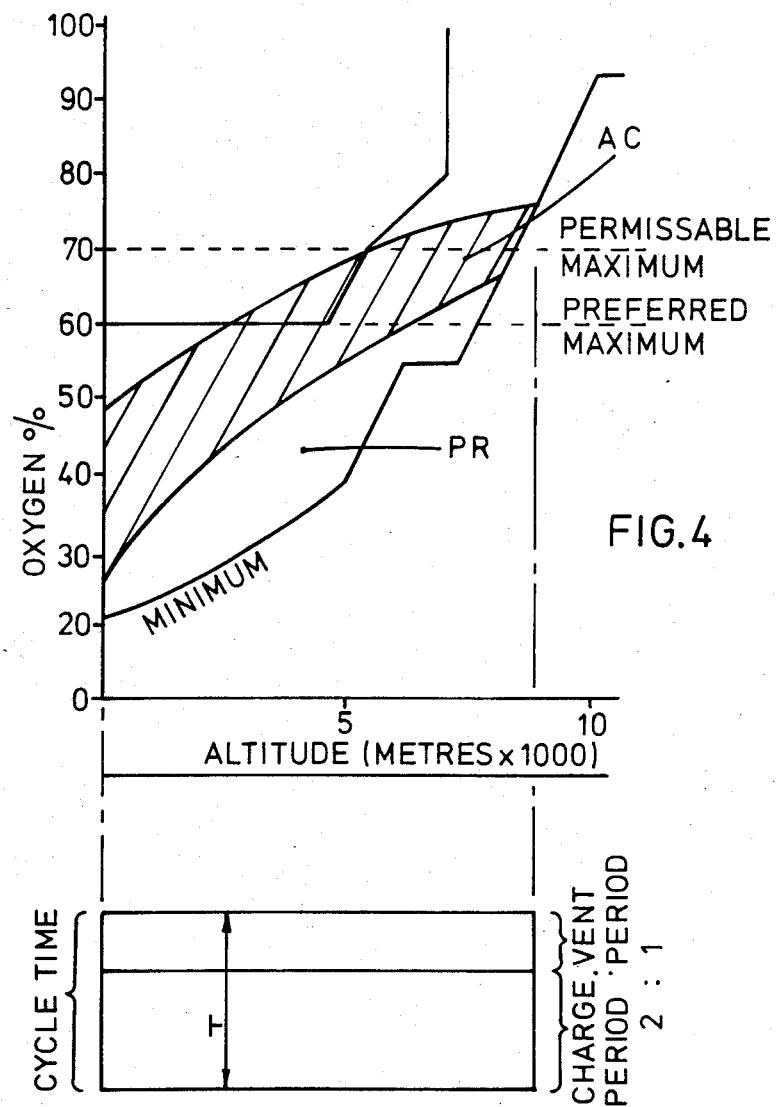
FIG. 4 is a graph showing an acceptable band of oxygen concentration against the physiological requirement for oxygen from ground level to 8,500 meters altitude.
FIG. 4A is a histogram showing the ratio of charge period to vent period in the total cycle time for obtaining the acceptable band of oxygen concentration shown in FIG. 4.

Thus, we have found that by selection of a suitable molecular sieve material and a suitable fixed cycle time it is possible to provide a simple system which will produce an acceptable, although less than optimum, oxygen concentration over a range of altitude. This can be seen in the graph of FIG. 4 which shows a representative acceptable band of concentration of oxygen, reference AC, and the band for the physiological requirement for oxygen, reference PR, from ground level to approximately 8,500 meters (28,000 feet) cabin altitude. FIG. 4A is a histogram showing that for a fixed cycle time T the charge period is twice that of the vent period.

We have found that an improvement over this acceptable, although less than optimum, band of concentration of oxygen can be made if the selected sieve material is of medical grade and if the cycle time of the bed is sequentially reduced with increasing altitude. Two sequential reductions in bed cycle time are shown in the histogram of FIG. 5A and reference to the graph shown in FIG. 5 illustrates that these reductions introduced at cabin altitude thresholds of 3,000 meters (10,000 feet) and 6,700 meters (22,000 feet) give three different bands of oxygen concentration in the product gas for three bands of altitude. In the two lower altitude bands the oxygen concentration bands, references A and B, are closer to the corresponding mean of the band for physiological requirement, reference PR, whilst at altitudes above 6,700 meters (22,000 feet) the band of oxygen concentration, reference C, is maintained substantially at the highest enrichment level obtainable from a molecular sieve oxygen generator system, i.e. in the order of 94 to 95 percent. In the lower region of the altitude band 3,000 to 6,700 meters, the oxygen concentration is greater than is physiologically necessary, but this is not medically detrimental. However, if desired one or more additional thresholds may be introduced and so provide bands that obtain more closely to the physiological requirement. The different thresholds can be effected by pressure transducer means, for example an altitude switch, arranged to modify the output signal of the sequencer to reduce the cycle time in each ascending altitude band.

What is claimed is:

1. A method for delivering oxygen-enriched air to a breathing mask of an occupant of an aircraft cabin comprising the steps of:
   supplying air to a molecular sieve bed system, the concentration of the oxygen-enriched gas exiting from the sieve bed system being a function of the partial saturation of the sieve bed;
   controlling the charge/adsorption on-stream phase and the purge/desorption regeneration phase so that a desired saturation of the sieve bed is maintained so as to produce an oxygen-enriched gas having a concentration appropriate for the actual cabin pressure; said controlling step including the steps of determining the cabin pressure, and then selecting the appropriate overall cycle time and relative duration of each phase from predetermined values appropriate for the determined cabin pressure such that the oxygen-enriched air remains within predetermined physiologically acceptable limits for breathing at the cabin pressure;
   venting to aircraft ambient atmosphere the sieve bed during the purge/desorption regeneration phase; and
   delivering the oxygen-enriched air directly to the breathing mask during the charge/adsorption phase.

2. A molecular sieve type gas separation system adapted to deliver oxygen-enriched air to an oral-nasal breathing mask for breathing by an occupant of an aircraft cabin, the system comprising:
   a supply line including supply valve means for supplying air to the system;
   at least one molecular sieve bed connected with said supply line and adapted for decreasing the non-oxygen content of the supply air;
   a delivery line including delivery valve means connected with said bed for delivering oxygen-enriched air from said bed to said breathing mask;
   a vent line including vent valve means connected with said bed for venting gas in said bed to aircraft ambient atmosphere or to aircraft cabin atmosphere;
   control means connected with said supply valve means and said vent valve means for controlling opening and closing thereof;
   said control means being adapted to cyclically subject said bed to a charge/adsorption on stream phase followed by a purge/desorption regeneration phase, and
   pressure transducer means sensing an altitude related pressure and operatively connected with said control means to vary the total cycle time of the on stream and regeneration phases of said bed in accordance with the sensed altitude related pressure such that for predetermined ranges of altitude related pressure the overall cycle time and the relative durations of each of the said phases are at values such that the oxygen content of the oxygen-enriched air delivered to said breathing mask from said sieve bed remains within predetermined physiologically acceptable limits for breathing at the actual cabin pressure.

3. A system according to claim 2 wherein the control means and pressure transducer means reduce the cycle time in steps as the sensed altitude related pressure reduces.

4. A system according to claim 2, wherein the control means provide, at least within one predetermined range of ambient atmospheric pressure or a pressure related thereto, phase relative durations in the ratio of 2:1 in favour of the charge/adsorption phase.

* * * * *